United States Patent [19]
Schuenhoff et al.

[11] Patent Number: 6,069,949
[45] Date of Patent: May 30, 2000

[54] CENTRAL OFFICE PROVIDING SERVICES FOR HIGH USAGE CUSTOMERS

[75] Inventors: Robert G. Schuenhoff, Valley Stream; William Perkins; Joseph W. Maese, both of Brooklyn, all of N.Y.; Robert Zingone, East Windsor, N.J.

[73] Assignee: Nynex Science and Technology Inc., White Plains, N.Y.

[21] Appl. No.: 08/736,854

[22] Filed: Oct. 28, 1996

[51] Int. Cl.[7] .............................. H04M 3/42; H04M 7/00; H04M 3/00

[52] U.S. Cl. .......................... 379/242; 379/201; 379/219; 379/230; 379/279

[58] Field of Search ..................................... 370/352, 353, 370/380, 389, 392, 396, 401, 404, 485, 427, 435, 450, 465; 379/90.01, 93.01, 93.05, 93.09, 219, 100.15, 333, 100.16, 201, 207, 230, 279, 242, 334

[56] References Cited

U.S. PATENT DOCUMENTS

| | | | |
|---|---|---|---|
| 4,771,425 | 9/1988 | Baran et al. | 370/85 |
| 5,247,347 | 9/1993 | Litteral et al. | 358/85 |
| 5,347,566 | 9/1994 | Law et al. | 379/27 |
| 5,369,696 | 11/1994 | Krauss et al. | 379/268 |
| 5,457,741 | 10/1995 | Sonobe | 379/333 |
| 5,526,353 | 6/1996 | Henley et al. | 370/60.1 |
| 5,566,239 | 10/1996 | Garcia et al. | 379/399 |
| 5,583,920 | 12/1996 | Wheeler, Jr. | 379/88 |
| 5,608,446 | 3/1997 | Carr et al. | 348/6 |

OTHER PUBLICATIONS

Cho et al., 'The SLC–96 System', The Bell System Technical Journal, Jul. 9, 1981.

Fraser et al., 'DMS–1 Urban: Flexible Architecture', Telesis, 1986, Sep. 10, 1999.

Primary Examiner—Krista Zele
Assistant Examiner—Allan Hoosain
Attorney, Agent, or Firm—Straub & Pokotylo; John C. Pokotylo

[57] ABSTRACT

A system which permits regional bell operating companies (RBOCs) and other telephone service providers to offer service to high usage customers (such as Internet service providers for example) without adversely and appreciably degrading the telephone service of other customers served by the same central office. The system provides D4 formatted DS1 signals to the high usage customers. The system also allows data to be transmitted to and from the high usage customers at the maximum possible line rate. Finally, the system permits the high usage customers to test individual lines or numbers within a hunt group.

15 Claims, 15 Drawing Sheets

CENTRAL OFFICE PROVIDING SERVICES FOR HIGH USAGE CUSTOMERS

BACKGROUND OF THE INVENTION a. Field of the Invention

The present invention concerns the provision of communication services required by high usage customers, and in particular, to Internet and on-line service providers.

b. Related Art

Although one skilled in the art understands the station equipment and transmission facilities used by regional bell operating companies (or "RBOCs"), a brief overview of such station equipment and transmission facilities is provided below for the reader's convenience.

FIG. 1 illustrates the use of transmission facilities by various types of services. As shown in FIG. 1, a number of geographically remote central switching offices 120 are coupled via "trunks" 114 and interoffice transmission facilities 118. Various entities, such as residences 102, businesses 104, and private branch exchanges (or "PBXs") 106 are coupled with a central switching office 120 via "lines" 110, 112 and "loop transmission facilities" 108.

Thus, a loop transmission facility (or "subscriber loop") 108 connects telecommunication equipment at a customer premises (e.g., a residence, business, etc.) with an associated central switching office 120. The loop transmission facility 108 is typically on the order of a few miles and usually includes paired copper wire. Interoffice transmission facilities 118, or trunks, connect different central switching offices 120. Interoffice transmission facilities 118 range from less than one mile to thousands of miles.

FIG. 2a is a block diagram showing the connection of two pieces of terminal equipment at customer premises served by separate central offices. Terminal equipment X 202 (such as a telephone or modem for example) is coupled with central office A 206, via loop 208. Similarly, terminal equipment Y 204 is coupled with central office B 210, via loop 212. Central office A 206 is coupled with central office B 210 via trunk lines 214. If all of the trunk lines 214 are busy, central offices A and B, 206 and 210, respectively, may be coupled via trunks 216 and 220 and tandem office C 218.

The flow diagram of FIGS. 3a through 3d illustrates steps involved with initiating a call from terminal equipment X 202 to terminal equipment Y 204, processing the call, and terminating the call in a system using "in-band" signaling. In communications systems, signaling performs three basic functions; namely (1) supervising functions, (2) alerting functions, and (3) addressing functions. Signaling for supervising functions monitors the status of a line or circuit to determine its state (i.e., whether it is busy, idle, requesting service, etc.). Voltage levels, tone or bits for example, are used for supervising function signals. Signaling for alerting functions is used, for example, to indicate the arrival of an incoming call with e.g., bells, buzzers, tones, strobes, lights, etc. Signaling for addressing functions is used to route signals over the network with, for example, dial pulses, tone pulses, and data packets.

Today, most signaling is carried out "in-band" (i.e., it goes along and occupies the same circuits as those which carry voice conversations. Such in-band signaling is usually carried out with multifrequeny or single frequency signals. Unfortunately, many toll calls are not completed because the called phone does not pick up or is busy. The circuit time used in signaling is substantial, expensive and wasteful. Out-of-band signaling (such as signaling system 7, or "SS7") uses circuit(s) separate from voice circuits, for signaling functions.

For the purposes of the following discussion, it will be assumed that the terminal equipment X 202 and Y 204 are telephones. However, the terminal equipment X 202 and Y 204 may be other types of equipment, such as a modem for example.

FIG. 3a shows actions taken at the telephone X 202 and the central office A 206 in initiating the call. First, as shown step 302, when the handset of telephone 202 is lifted, it sends an off-hook signal to the central office A 206 via loop 208. At central office A 206, a change from on-hook to off-hook status is detected. More specifically, when the telephone X 202 is taken off-hook, a circuit is established and the central office A 206 detects a DC current flowing through the established circuit. As shown in step 304, this change in status is interpreted as a request for service. Next, as shown in step 306, assuming that an originating register is available to accept and store the digits to be dialed by telephone X 202, the central office A 206 connects a dial tone signal to the telephone X 202 via loop 208. Line side equipment 234, such as an analog line unit (or "ALU") or a digital line unit (or "DLU") for example, provides the dial tone signal. As shown in step 308 a number is then dialed at telephone X 202. In response, as shown in steps 310 and 312, once the first digit of the number is recognized, the dial tone is disconnected and the numbers are stored in the originating register.

FIG. 3b shows actions taken at the central office A 206 in processing the call. First, as shown in step 314, control equipment at central office A 206 translates the dialed number. As shown in step 316, by examining the leading digits (e.g., the first three digits) of the dialed number, the control equipment determines whether the call is to another central office (i.e., an "inter-office" call) or to a subscriber serviced by the same central office (i.e., an intra-office call). In this example, it is assumed that the call is to telephone Y 204 which is served by a separate central office; namely, central office B 210. Next, as shown in step 318, routing information stored in the system indicates which paths (or "trunk groups") are appropriate and translates the desired paths to representations of physical locations of terminations of the trunks. As shown in step 320, if the call is billable, an automatic message accounting (or "AMA") register is requested to enable the telephone service provider to bill the appropriate parties. Next, as shown in step 322, the call information is transferred to an outpulsing register and the originating register is released. Then, as shown in step 324, the control equipment at central office A 206 begins scanning outgoing trunks to find an idle trunk to central office B 210.

If an idle trunk is found, as indicated in step 326, the call be transmitted directly from central office A 206 to central office B 210 via a free trunk 214. If, on the other hand, all trunks 214 from central office A 206 to central office B 210 are busy, then outgoing trunks 216 to tandem switching office C 218 are scanned such that the call may be routed from central office A 206 to central office B 210 via tandem switching office C 218.

FIG. 3c illustrates the actions taken to advance the call to the terminating central office; namely central office B 210. First, as shown in step 328, the idle trunk found in step 326 is seized. In response, as shown in steps 330 and 336, at central office B 210, an incoming register of a switch is seized and control equipment sends a ready signal back to central office A to indicate that the seized incoming register is ready to receive address information. In the meantime, as shown in step 332, at central office A 206, the line of telephone X 202 is connected, via the loop 208 and a switching network within central office A 206, to the seized trunk. In addition, as shown in step 334, control equipment at central office A 206 scans the outgoing trunk for the ready signal.

As shown in steps 338 and 340, when the ready signal sent by central office B 210 is received and detected by central office A 206, the call information is communicated from the outpulsing register of central office A to the seized incoming register of central office B 210. Next, as shown in step 342, before the last digit of the dialed number is sent, the control equipment at central office A 206 checks to see if telephone X 202 is still off-hook. If telephone X 202 is on-hook, the call is abandoned and the control equipment at central office A will terminate the call processing sequence and release associated equipment and circuits (e.g., seized registers, trunks, etc.). If, on the other hand, telephone X 202 is still off-hook, as shown in steps 344 and 346, the last digit of the dialed number is transmitted from the outpulsing register of central office A 206 to the incoming register at central office B 210 and the outpulsing register of central office A 206 is released.

FIG. 3d illustrates the actions taken to complete the call. First, as shown in step 350, the digits of the called number stored in the incoming register of the central office B 210 are translated to a physical location of the termination of the loop 212 of telephone Y 204 at central office B 210. Next, as shown in step 352, the status of the loop 212 of telephone Y 204 is checked to determine whether it is idle or busy. If the loop 212 is busy (i.e., telephone Y 204 is off-hook), a busy signal is returned to telephone X 202 via the switching network of central office B 210, trunk 214, the switching network of central office A 206, and loop 208. However, for purposes of this example, it is assumed that the loop 212 of the telephone Y 204 is idle (i.e., telephone Y is on-hook). In such a case, the incoming trunk 214 is coupled with the loop 212 of telephone Y 204 via the switching network of central office B 210. Next, as shown in steps 356, 358, and 360, a ringing register in central office B 210 is seized, the incoming register which stored the dialed number is released, and a ring signal is enabled. The ring is generated by the control equipment. As shown in steps 362 and 364, the ring signal causes an audible ring to be transmitted to telephone X 202 (via the switching network of central office B 210, trunk 214, the switching network of central office A 206, and loop 208) and causes telephone Y 204 to ring (via loop 212). Control equipment at central office B 210 monitors the status of the telephone Y 204. If the handset of the telephone Y 204 is taken off-hook (see step 366) the ringing signal is disabled. The conversation then begins. Further, as shown in step 368, answer supervision, used to record answer or connect time for billable calls, is provided by control equipment at central office A 206.

As shown in step 370, control equipment at central office A 206 monitors the outgoing trunk 214 for disconnect. The call is terminated if either telephone X 202 or telephone Y 204 is hung up, i.e., if its handset is placed on-hook. If the calling party, i.e., telephone X 202, hangs up first, the connection is released (see step 374), and disconnect supervision is sent to central office B 210. The trunk is then idled when central office B returns on-hook supervision. If, on the other hand, the called party, i.e., telephone Y 204, hangs up first, a timed release period of 10 to 11 seconds is initiated. Finally, as shown in steps 372 and 374, upon the expiration of this timed release period, the connection is released.

The above example describes an inter-office call. An intra-office call is handled similarly except that an idle trunk line is not needed. Basically, for intra-office calls, steps 314, 316, 318, 320, 322, 324, 326, 328, 330, 332, 334, 336, 338, 342, 344, and 346 are not performed. Moreover, steps 350, 352, 354, 356, 358, 360, 364, 366, and 372 are all performed at central office A.

To reiterate, the above described flow diagram of FIGS. 3a through 3d illustrates the steps involved with initiating a call from terminal equipment X 202 to terminal equipment Y 204, processing the call, and terminating the call, in a system using "in-band" signaling. Many present day inter-office networks now use out-of-band signaling such as SS7 signaling to "set up" (or establish) and "tear down" (or terminate) a call. SS7 is used to send messages between remote switching equipment. SS7 is advantageous because it uses separate circuits for signaling and voice data. To reiterate, in the previous systems, the same circuit was used for both signaling and voice data. Such previous systems were disadvantageous because if a circuit was being used for signaling, it could not be used for voice. On the other hand, with SS7, voice trunks are only used when a connection is established.

FIG. 2b is a high level block diagram of equipment that may be provided at a central office such as central office A 206 for example. The concentration of traffic will be explained with reference to FIG. 2b. As shown in FIG. 2b, a switching network 230 is connected to a number of trunks 214 via one or more interface modules 238, each including one or more trunk terminating units (not shown), such as a digital line trunk unit for example. In this example, each trunk 214 may carry 24 channels which are time division multiplexed. More specifically, 24–64 Kbits/second channels are carried by a trunk which can accommodate 1.544 Mbits/second. Such a trunk is known as a "T1" trunk. A number of such T1 trunks 214 connect all stations and lines outside the local loop, known as the public switched telephone network (or "PSTN") 232, with a "trunk side" 230a of the switching network 230.

The switching network 230 is also connected to a number of loops 208 via one or more interface units 240, each including one or more line terminating units (not shown), such as an analog line unit (or "ALU") or a digital line unit (or "DLU") for example. The line units housed in interface unit(s) 240 are used, inter alia, to provide dial tone and ringing. As discussed above, one or more of the line units may be analog line units. Each analog line unit outputs a number of analog lines 208, each of which may run to a particular customer's premises directly or via additional equipment. As stated above, one or more of the line units 240 may also be a digital line unit (or "DLU"). In this case, each integrated digital carrier unit has a number of ports to which digital lines may be connected.

To ensure that each line 208 can always access an idle channel on a trunk 214, the switching network 230 may be engineered to provide a number of trunk channels equal to the number of lines 208. However, such an arrangement is usually not cost effective in the real world. Specifically, the amount of traffic handled by a switching network 208 can be measured and/or estimated. The unit hundred call seconds (or "CCS") is used when describing network traffic during peak hours. For example, "36 CCS" means that a line is being used constantly (i.e., 3600 seconds per hour) during a given time period. The switching network 230 is designed and engineered based on anticipated traffic. If the expected traffic volume is relatively low, more loops can be serviced by fewer trunk channels. Conversely, if the expected traffic volume is relatively high, more trunk channels are needed to service the loops. The term "concentration ratio" (when used with reference to a central office switch) is used to define the number of lines (or loops) to customers divided by the number of paths (or channels) to the public switched telephone network (PSTN). In most residential areas, the central office switch is engineered for 2 CCS, in most business areas, the central office switch is engineered for 3 CCS, and in urban areas, the central office switch is engineered for 4 to 6 CCS. Thus, the switching network can be more highly concentrated in residential areas than urban business areas for example.

FIG. 2c is block diagram of the architecture of switching equipment known as a 5ESS switch. On the trunk side, the public switched telephone network 232 accesses the network switch 230 via trunk facilities 214, digital trunk unit(s) 236, and interface module(s) 238 (also called "switching modules"). Each of the interface modules 238 includes a time slot exchange which re-orders the time slots of incoming time multiplexed channels based on transfer logic. Each interface module 238 provides, via two optical fiber links 252, 512 time division multiplexed channels to a time multiplexed switch 254 of a communications module 250 of the switching network.

On the loop side, subscribers served by the central office access the network switch via copper wire pairs 208 or optical fiber carrying channelized digital signals, line units 234, and interface modules 240. As was the case on the trunk side, each of the interface modules 240 includes a time slot exchange which re-orders the time slots of incoming time multiplexed channels based on transfer logic. Again, each interface module 240 provides, via two optical fiber links 252, 512 time division multiplexed channels to the time multiplexed switch 254 of the communications module 250 of the switching network 230.

The time multiplexed switch 254 can be thought of as a cross bar switch having cross connected states which change with changing time slots. The administrative module processor 262 of the administrative module 260 provides centralized routing control to the time multiplexed switch 254 via message switch 256.

The 1ESS switch of FIG. 2C may be engineered for urban traffic as follows. A line side interface module 240 may include three (3) integrated digital carrier units ("IDCUs") 234, each having 40 ports which terminate a digital line carrying 24 channelized signals. Thus, a first concentration of approximately 5.6 is carried out on the line side. Specifically 2880 channels (24 channels/fiber*40 fiber ports/IDCU*3 IDCUs/interface module) are concentrated to 512 channels. On the trunk side, each digital line trunk unit concentrates the 512 channels to approximately 64 channels for a concentration ratio of 8 to 1. Lastly, assuming that the central office services 80,000 subscribers, each averaging 5 CCS, the switch network 230 must be engineered to handle 400,000 CCS. Although each channel can theoretically handle 36 CCS, overhead associated with each channel reduces this capacity to an actual value of about 32 CCS. Thus, 12,500 trunk channels (i.e., 400,000 CCS divided by 32 CCS/trunk channel) are needed. Trunks having differing capacities may be used to support this traffic. For example, about 521 (i.e., 12500 divided by 24) T1 trunks, each of which can handle 24–64 Kbit/second channels, would be needed to support such anticipated traffic.

Thus, there are two concentration ratios at the switch; one at the line side, from the lines to the switch, and one across the switch from the lines to the trunks. Both are based on anticipated usage. However, since a trunk channel or path may be freely allocated, the total line to trunk concentration ratio (e.g., 8 to 1 or 9 to 1) may be higher than the line side concentration ratio (e.g., 5.6 to 1)

With this background information in mind, the problem posed by relatively new classes of high usage telephone service customers, such as Internet and on-line service providers for example, is discussed below. Internet service providers (or "ISPs") or enhanced service providers (or "ESPs") have experienced explosive growth during the mid-1990s as customers desire access to the Internet and other proprietary networks. Moreover, this growth is expected to continue or accelerate, at least in the near future. Moreover, other "non-browsing" data access services, such as on-line banking, telecommuting, government agency (e.g., IRS) help lines, and real estate databases and research for example, have also been growing and are expected to continue growing.

This explosive growth, coupled with the typical usage patterns of the use of the Internet, has created unique service delivery challenges for regional bell operating companies (RBOCs) and other telephone service providers. Specifically, at the present time, the Internet contains vast amounts of diverse information. Although certain servers on the Internet (or "web sites") provide directory information and/or search engines to enable users to more efficiently locate and access information, many Internet users enjoy the adventure of so-called "net surfing". Specifically, most web sites include "hyper-text links". A hyper-text link is text, that upon being clicked (or activated) by a user, invokes the server of that web site to route that user to another web cite which is related to the text of the hyper-text link. Thus, in many instances, users, accessing the Internet through a local Internet provider, may occupy a line, maintained by the switching network 230 of a central office, almost continuously during certain hours. Further, Internet service providers (or ISPs) have typically bought small numbers of 1 MB (or "1 Message Business") lines; 1MB being a tariffed service developed to handle traffic of about 3 CCS. Consequently, a central office having a switching network engineered for traffic expected to be 3 CCS, 6 CCS, or even 8 CCS, must handle traffic which, in many instances, approaches 36 CCS.

It was first thought that most Internet or on-line activity would occur during early morning hours. If this were the case, such heavy "data type" usage during light traffic periods would have better utilized embedded investment in switching and transmission facilities, thereby contributing to the revenue stream of RBOCs and other telephone service providers at times when very few calls are made. Unfortunately, however, recent studies of certain Internet service provider lines have indicated that traffic is heavy during the daytime. For example, a multi-line hunt group for one Internet service provider was being used at between 25 CCS and 35 CCS from 10 AM to midnight. It is believed that such tendencies during daytime usage is being fueled by the growing number of colleges and corporation providing their students and employees with access to Internet and on-line service providers.

This unanticipated heavy traffic caused by high usage customers, such as Internet service providers for example, has loaded down switching networks 230 and associated analog line units at central offices of regional bell operating companies (RBOCs) and other telephone service providers. Again, analog line units provide dial tone, ringing, and access to the loop or line side of the switching network 230.

Regional bell operating companies (RBOCs) are regulated by the Public Service Commission and must meet certain minimum service level requirements. For example, ordinary telephone customers expect, and the Public Service Commission requires, that dial tone will be provided when a customer takes the handset of their telephone off-hook. However, in instances where high usage customers, such as Internet service providers, are encouraging usage of a central office switching network 230 far in excess of its engineered capacity, service level problems (e.g., no dial tone) result.

FIG. 4a is a high level block diagram of a known arrangement for providing telephone services to a high usage customer 404. In the solution illustrated in FIG. 4a, the switch 408 (for example a DMS-100 from NorTel), which includes a switching network 410 and analog line units 412, is designed for non-blocking operation. That is, the concentration ratio of the number channels from the line side of the central office 402 to the number of channels defined by the trunks 430 from the public switched telephone network (PSTN) 432 is relatively low (e.g., less than four (4).

Digital signals present on channels of the trunks 430 are converted to analog signals by the switch 408. These analog signals are carried by copper wire pairs 414 to a main distribution frame (or "MDF") 416. The main distribution frame 416 outputs analog signals onto copper wire pairs 418. Thus, the main distribution frame 416 functions to enable the connection of the copper wire pairs 414 to the copper wire pairs 418. The copper wire pairs 418 are bundled and routed to the customer premises 404 to provide individual DS0 handoffs at terminals 420. An Internet or on-line service provider will typically have modems (not shown) coupled with these terminals 420.

Unfortunately, this arrangement has two major disadvantages. First, there is a trend towards using optical fiber, rather than copper, to connect local customers with their central office. This trend is due to the fact that optical fiber has a much higher bandwidth than copper pairs such that a number of DS0 channels can be multiplexed onto a single optical fiber. Moreover, data carried on optical fiber is much more robust than that carried on copper, being less sensitive to external elements and noise.

Another disadvantage of the known system of FIG. 4a manifests itself when a high usage customer, such as an Internet or on-line service provider for example, generates so much traffic as to cause blocking at an analog line unit 412 servicing it. One solution to this problem is known as "load balancing". The load balancing solution involves "line equipment transfers", i.e., taking high usage customers and transferring them to analog line units which have been handling less load thereby distributing the high usage lines across a number of analog line units. Unfortunately, this solution is problematical. First, load balancing, which requires line equipment transfers, is expensive to implement. Specifically, in a switching system database, the analog line unit number must be changed. In addition, the wiring must be changed to connect the high usage customer 404 to the lesser loaded analog line unit(s).

FIG. 4b is a high level block diagram of a known arrangement that avoids one of the problems of the arrangement of FIG. 4a. Specifically, it avoids the copper distribution found in the arrangement of FIG. 4a by providing copper lines 418 exiting the main distribution frame 416 to a universal subscriber line carrier (or "SLC") 422 which (i) converts the analog DS0 signals of the copper lines 418 to digital signals, and (ii) combines a number of DS0 digital signals into a channelized T1 signal. A channelized T1 signal includes 24–64 Kbps DS0 signals. The channelized T1 signal has a TR008 format which is a proprietary AT&T format. Optical fiber 426 carries the T1 signal to a high usage customer premises 404' where a remote SLC 424 converts the digital T1 back to a number of analog DS0 signals 420. The analog DS0 signals 420 may be applied to modems (not shown) for example. Thus, the arrangement of FIG. 4b is similar to that of FIG. 4a except that the central office (or universal) SLC 422 converts and concentrates analog signals to time division multiplexed digital signal(s) having a TR008 (a proprietary AT&T) format and the universal remote terminal SLC 424 converts and expands the TR008 formatted time division multiplexed digital signal (s) to analog signals.

Although the arrangement of FIG. 4b utilizes the preferred distribution medium of optical fiber, blocking at an analog line unit can still only be solved by load balancing, as discussed above with reference to FIG. 4a. Moreover, the arrangement shown in FIG. 4b has certain problems of its own. For example, it has been reported that the modems coupled with lines 420' cannot consistently operate at 28.8 Kbit/second. However, the source of this problem has not yet been determined with certainty. The inventors of the present invention believe that this may be due to the number of analog to digital and digital to analog conversions which occur in this arrangement.

Finally, FIG. 4c illustrates a known arrangement used in certain areas. This arrangement exploits the integration of universal SLC functionality into the switch 408 itself. Specifically, integrated digital carrier units (or "IDCUs") 424 are used instead of, or in addition to, analog line units 412. The IDCU 424 outputs a TR008 formatted digital T1 signal. This signal may be carried, via optical fiber 426, to customer premises 404'. As was the case with the arrangement disclosed in FIG. 4b, at the customer premises 404', a remote SLC 424 converts and expands the digital T1 signal back to a number of analog DS0 signals. The analog DS0 signals 420 may be applied to modems (not shown) for example.

While the arrangement of FIG. 4c advantageously avoids a number of digital to analog and analog to digital conversions and integrates the functionality of the universal SLC 422 into the switch 408', the integration of the functions of the universal SLC 422 into the switch 408' makes this arrangement ill suited for servicing high usage customers. This is because the above described load balancing solution is not available. That is, the lines of such high usage customers cannot be distributed, by changing cross connects at a main distribution frame 416, across a number of analog line units 412. Accordingly, the arrangement shown in FIG. 4c has not been successfully used to provide a number of lines to a high usage customer.

Finally, solving blocking problems using a trunk side solution is not acceptable in most instances because Internet service providers often want the ability to test a sequence of numbers in a hunt group. A hunt group is a sequence of numbers with a published lead number. For example, a hunt group of 100 numbers may start with the published lead number ###-#000 and end with ###-#099. When a call comes into line ###-#000, if that line is busy, the circuitry in the interface module 238 or 240 hunts for the next available (i.e., idle or on-hook) number. Again, Internet service providers require the ability to test each number individually so that equipment (e.g., modems) may be tested and faults isolated. Thus, if a call comes into an unpublished, non-lead number of the hunt group (e.g., ###-#055), the interface module 238 or 240 will not hunt for a free line if the called line is busy. In many cases, this requirement precludes a trunk side solution to the blocking problem. That is, a trunk has a lead number only. Calls to the lead number can be carried by any available channel (or time slot) of the trunk.

SUMMARY OF THE INVENTION

In view of the above mentioned problems caused by high usage customers, such as Internet and on-line service providers for example, a system which permits regional bell operating companies (RBOCs) and other telephone service providers to offer service to such high usage customers without adversely and appreciably degrading the telephone service of other customers served by the same central office is needed. The system should preferably provide D4 formatted DS1 signals to the high usage customer. The system should also allow data to be transmitted to and from the high usage customers, such as Internet and on-line service providers, at the maximum possible line rate. The system should permit Internet and on-line service providers to test individual lines or numbers within a hunt group.

Moreover, the increased level of competition from traditional long distance providers, cable companies, etc., expected from the Telecommunications Act of 1996 will increase marketplace volatility. Consequently, the risk of near-term investment in a switching network is also increasing. Accordingly, deploying adaptable technologies that can be reused elsewhere in the network, thereby avoiding "stranded" investment in capital, is becoming increasingly important.

The present invention meets the above mentioned needs by providing a system for providing telephone services to a high usage customer from a central office coupled with local users via loops and a public switched telephone network via trunks The system includes a central office switch including a switching network, a first interface module, a second interface module, and a third interface module. The first interface module has a trunk unit. At least one of the trunks accesses the switching network via the trunk unit and the first interface module. The second interface module has a digital line unit. The high usage customer accesses the switching network via the digital line unit and the second interface module. Finally, the third interface module has a line unit. At least one of the loops accesses the switching network via the line unit of the third interface module and the third interface module.

The digital line unit provides a number of channels to the high usage customer and the second interface module provides a number of channel paths to the switching network. In a preferred embodiment of the system of the present invention, the number of channels to the high usage customer are not concentrated by the digital line unit and the second interface module. In another embodiment of the system of the present invention, the concentration ratio of the number of channels to the high usage customer to the number of channel paths to the switching network provided by the second interface module is approximately one. In yet another embodiment of the system of the present invention, the concentration ratio of the number of channels to the high usage customer to the number of channel paths to the switching network provided by the second interface module is no more than one. In still another embodiment of the system of the present invention, the concentration ratio of the number of channels to the high usage customer to the number of channel paths to the switching network provided by the second interface module is less than one. Finally, in a preferred embodiment of the system of the present invention, the concentration ratio of the number of channels to the high usage customer to the number of channel paths to the switching network provided by the second interface module is 480-to-512.

In the system of the present invention, at least one trunk accessing the switching network via the trunk unit and first interface module defines a number of channels and the first interface module provides a number of paths to the switching network. In a preferred embodiment of the system of the present invention, the concentration ratio of the number of paths to the switching network provided by the first interface module to the number of channels defined by the at least one trunk is approximately one. In yet another embodiment of the system of the present invention, the concentration ratio of the number of paths to the switching network provided by the first interface module to the number of channels defined by the at least one trunk is less than eight. Finally, in still another embodiment of the system of the present invention, the concentration ratio of the number of paths to the switching network provided by the first interface module to the number of channels defined by the at least one trunk is less than one.

In a preferred embodiment of the present invention, the digital line unit provides digital signals in the D4 format. The digital line unit may be a customized subscriber module urban.

Another embodiment of the system of the present invention further includes a signal conversion terminal for converting TR008 formatted digital signals to D4 formatted digital signals. The signal conversion terminal is coupled with a digital line unit which provides digital signals in the TR008 format. The digital line unit may be an integrated digital channel unit.

A second embodiment of the present invention provides a system for providing telephone services to a high usage customer from a central office coupled with local users via loops and a public switched telephone network via trunks. The system includes a central office switch having a local trunk connection, a switching network, a first interface module, a second interface module, and a third interface module. The local trunk connection provides communication between the high usage customer and the central office. The first interface module has a first trunk unit. At least one of the trunks accesses the switching network via the first trunk unit and the first interface module. The second interface module has a second trunk unit. The local trunk connection accesses the switching network via the second trunk unit and the second interface module. The third interface module has a line unit. At least one of the loops accesses the switching network via the line unit of the third interface module.

Preferably, in the second embodiment of the system of the present invention, the high usage customer has a premises including a multiplexer-demultiplexer and a plurality of terminal equipment. The multiplexer-demultiplexer has a concentrated side and an expanded side. Each of the plurality of terminal equipment has an operational support system and is coupled with a port on the expanded sided of the multiplexer-demultiplexer of the premises of the high usage customer.

Preferably, in the second embodiment of the system of the present invention, the central office further includes a multiplexer-demultiplexer having a concentrated side and an expanded side. The expanded side of the multiplexer-demultiplexer of the central office is coupled with local trunk connection. The system further includes a communications link. A first end of the communications link is coupled with the concentrated side of the multiplexer-demultiplexer of the central office and a second end of the communications link is coupled with the concentrated side of the multiplexer-demultiplexer of the premises of the high usage customer.

Preferably, in the second embodiment of the system of the present invention, at least one of the plurality of terminal equipment is a T1 data service unit (or "DSU").

BRIEF DESCRIPTION OF THE DRAWINGS

FIGS. 2b and 2c illustrate a switch that may be used in a central office of FIG. 2a.

DETAILED DESCRIPTION

Figure 5A:
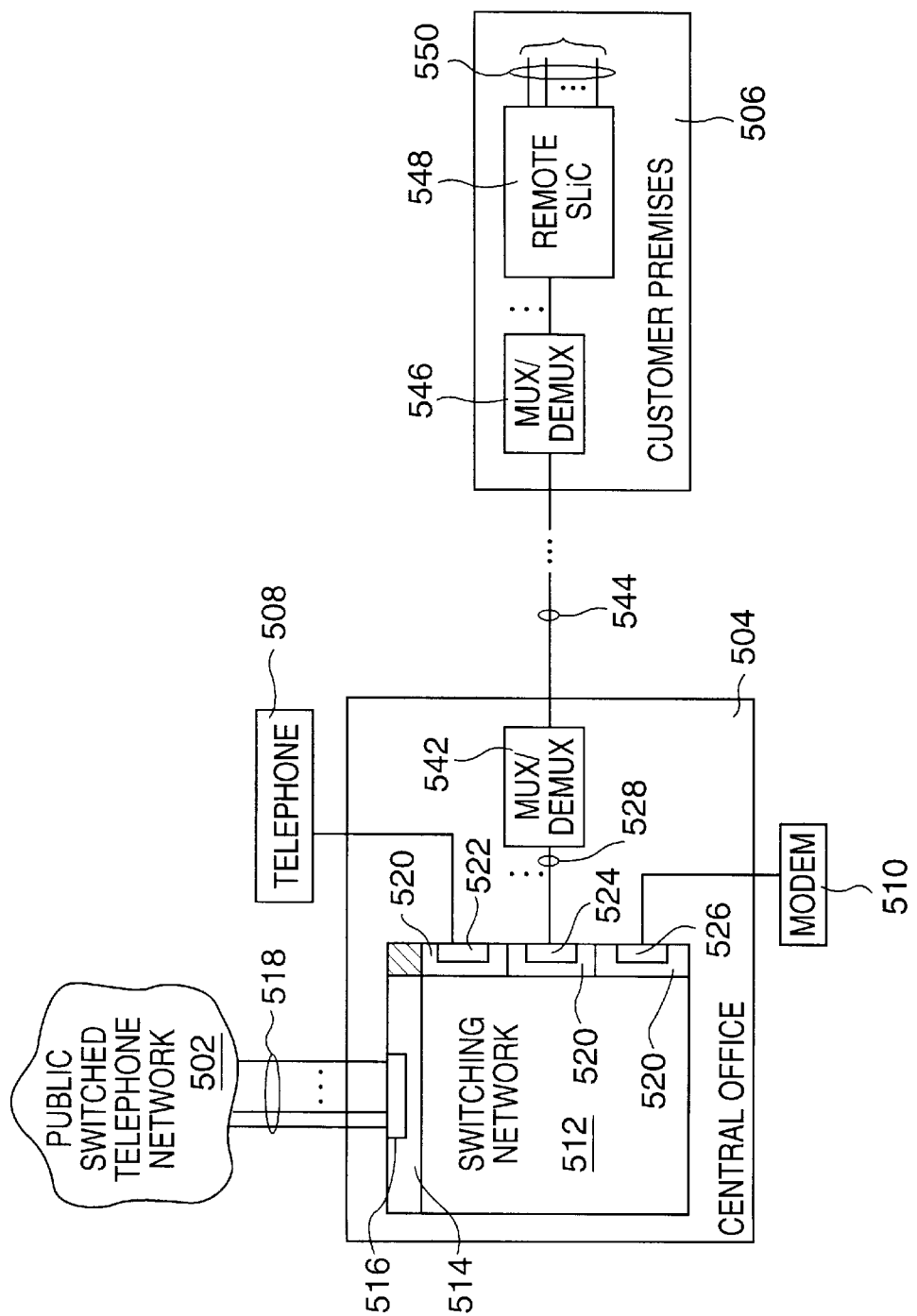
FIG. 5a is a high level block diagram of a first embodiment of the system of the present invention.

FIG. 5a is a block schematic of a first embodiment of the system of the present invention. Basically, the first embodiment of the system of the present invention functions to: (i) isolate high CCS traffic generated by a high usage customer, such as an Internet service provider, 506 from other traffic to prevent blockages at the line units 522, 526 and the switching network 512 of the central office 504; (ii) permit high speed data transmission; and (iii) permit the high usage customer (e.g., Internet service provider) 506 to test terminal equipment 550 by dialing a non-hunting line.

The central office 504 includes a switching network 512 which can connect any one of a channel of the public switched telephone network 502, a telephone within the local loop 508, a modem within the local loop 510 and a modem or telephone (not shown) of a high usage customer (e.g., an Internet or enhanced service provider) 506 within the local loop. On the trunk side of the switching network 512, one or more digital line trunk units 516 terminate trunks 518 from the public switched telephone network 502 and access the switching network 512 via interface module(s) 514. On the loop or line side of the switching network 512, analog line units (e.g., 522 and 526) provide analog lines (e.g., from a main distribution frame—not shown) with access to the switching network 512 via interface modules 520. In addition, on the loop or line side, one or more integrated digital channel units (or "IDCUs") 524 provide access to the switching network via one or more interface modules 520. In this particular device, the switching network 512 may accommodate up to 192 interface modules (also called "switch modules") 514, 520. The line side interface modules 520 and trunk side interface modules 514 may be embodied by physically identical devices, only identifiable as "line side" or "trunk side" based on the units they house and the channels (lines or trunks) they terminate.

In the central office 504, the IDCU 524 outputs time division multiplexed digital signals in the TR008 (AT&T proprietary) format onto line(s) 528. Each of the line(s) 528 is preferably a T1 (i.e., 1.544 Mbps) line. The electrical signals on the line(s) 528 may be converted to optical signals, carried by optical fiber 544 to the customer premises 506, reconverted to electrical signals, and applied to remote terminal SLC 548. The remote terminal SLC 548 converts the TR008 formatted digital signals to analog signals which may be provided, via copper lines 550, to modems (not shown). Optional multiplexer/demultiplexers 542 and 546 may be provided at the central office 504 and the customer premises 506 so that the T1 signal(s) may be time division multiplexed onto a higher bandwidth line. These optional multiplexer/demultiplexers 542 and 546 may also include electrical to optical and optical to electrical signal conversion functionality.

The structure of the switching network 512 and its peripherals are described in more detail below. First, on the line side of the switching network 512, although the interface module 520 servicing the Internet or enhanced service provider 506 may be fitted with a plurality of integrated digital carrier units (IDCUs), in the system of the present invention, it is fitted with only one IDCU 524. Moreover, the IDCU 524 has 40 ports for accommodating 40 TR008 formatted lines, each carrying 24 time slotted channels. In the system of the present invention, only 20 of the 40 ports of the IDCU are used. Since the interface module 520 housing the IDCU 524 has 512 paths (or time slots or channels) into the switching network 512, there is no concentration of the channels at the line side of the switching network 512. Specifically, 480 line side channels (i.e., 20 ports*24 channels/port) contend for 512 channels. Thus, the line side of the switching network permits non-blocking operation. It should be noted however, that other line units (e.g., 522 and 526) housed by other interface modules 520 may concentrate the line side channels.

Moreover, rather than having a typical total line side to trunk side concentration ratio of 8 to 1, the system of the present invention does not concentrate, or provides much less concentration. Finally, the switching network 512 is itself expanded to handle the additional traffic caused by the high usage customer (e.g., an Internet or enhanced service provider) 506.

Thus, the first embodiment of the present invention illustrated in FIG. 5a isolates high CCS traffic generated by a high usage customer 506, such as an Internet service provider, from other traffic to prevent blockages at the line units 522, 526 and the switching network 512 of the central office 504 and permits high speed data transmission.

Figure 5B:
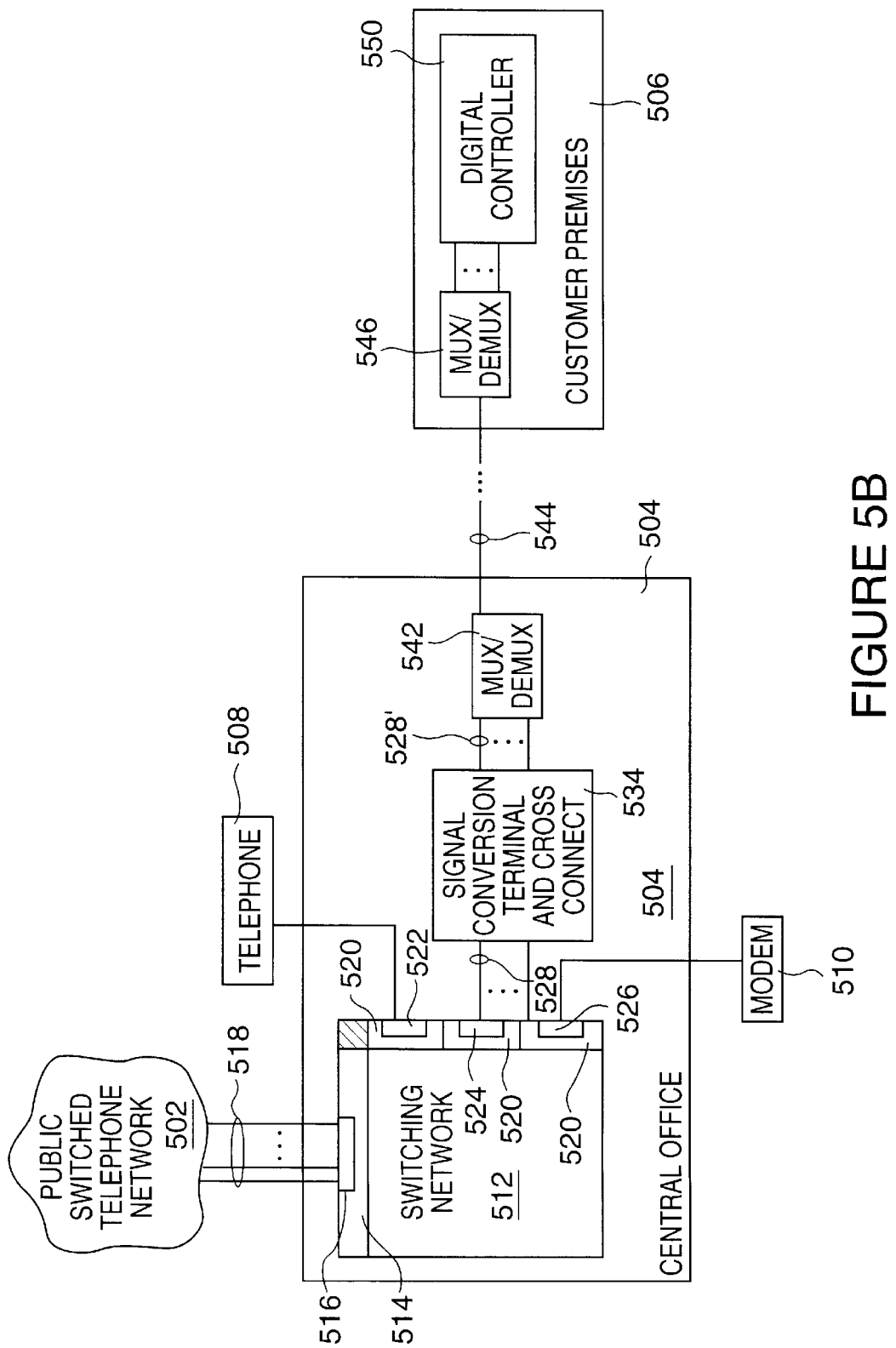
FIG. 5b is a high level block diagram of a second embodiment of the system of the present invention.

The second embodiment of the present invention shown in FIG. 5b is similar to the first embodiment of FIG. 5a except that a signal conversion terminal 534 is added and a digital controller 550 replaces the remote SLC 548. The signal conversion terminal 534 is a digital cross connect switch which may be a DXCS model sold by Digital Switch Corp., a DACS model sold by AT&T, a LIGHTSPAN model sold by Digital Switch Corp., or a DCS model sold by Alcatel. Basically, in addition to its function as a digital cross connect switch, the signal conversion terminal 534 also converts a TR008 formatted DS1, which is a proprietary AT&T format, to a D4 formatted, or "channelized", DS1. The output 528' of the signal conversion terminal 534 may be applied directly to a digital controller 550 at the customer premises 506. Alternatively, optional multiplexer/demultiplexers 542 and 546 may concentrate the digital signals onto a higher bandwidth link 544 and expand the concentrated signals.

Figure 6:
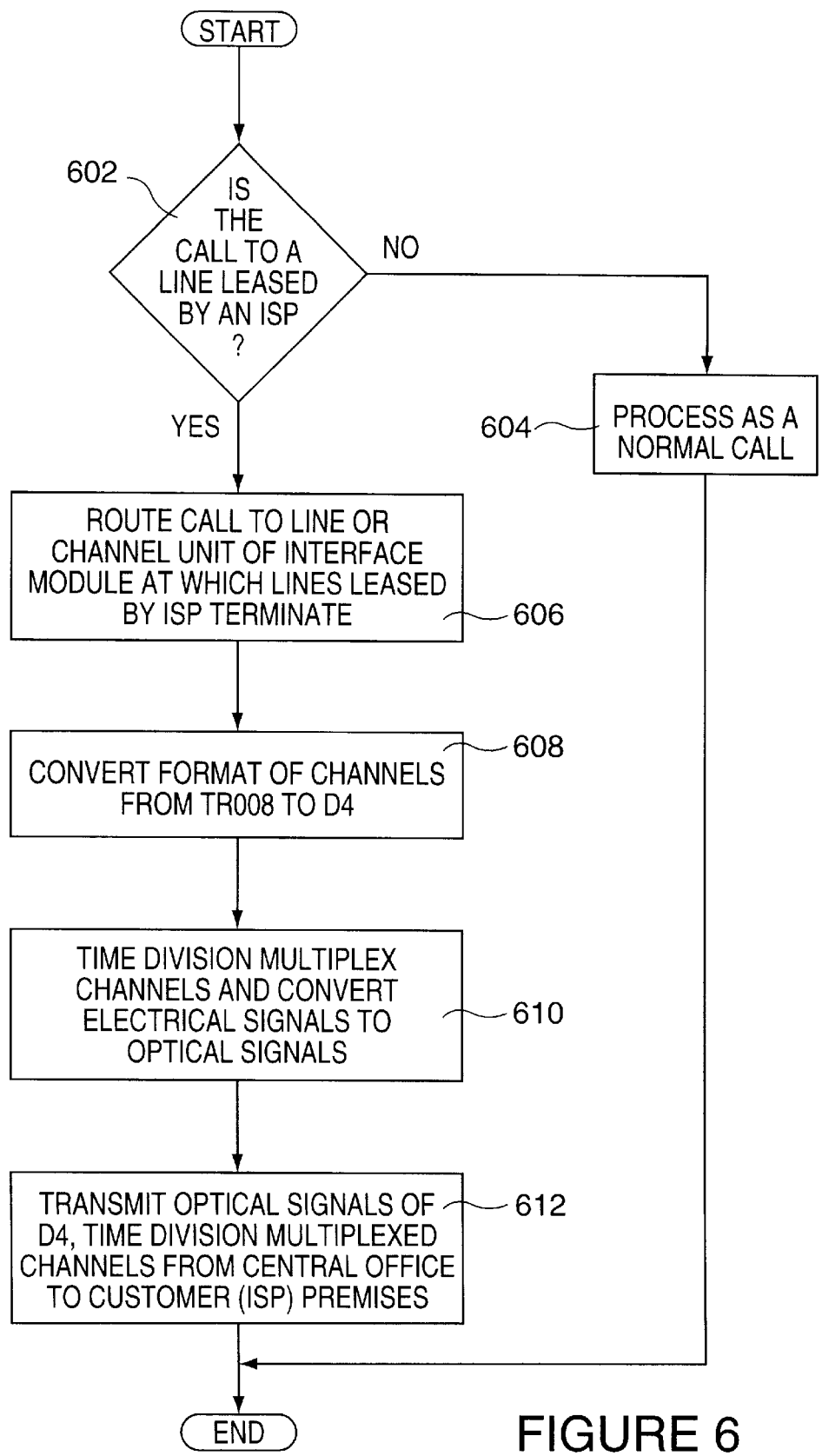
FIG. 6 is a flow diagram which illustrates the method steps performed by the first embodiment of the system of the present invention.

The operation of the second embodiment of the present invention, as illustrated in FIG. 5b, is described below with reference to FIGS. 5b and 6. If someone calls the enhanced service provider 506, the switching network 512 routes the call to the IDCU 524 of the interface module 520 as shown in steps 602 and 606. The call may arrive at the switching network 512 from the public switched telephone network 502 via one of the trunks 518, a digital line trunk unit 516, and an associated interface module 514. On the other hand, the call may arrive at the switching network 512 from a local subscriber via an IDCU or analog line unit (e.g., 522 or 526) and an associated interface module 520.

As described above, the IDCU 524 provides up to 20 T1 lines each having 24 TR008 formatted digital channels. Next, as shown in step 608, the signal conversion terminal 534 converts the format of these digital channels from the TR008 format to the D4 format. Recall that in the first embodiment of the present invention shown in FIG. 5a, this signal conversion step is not performed. Next, as shown in step 610, the optional mux/demux 542 time division multiplexes the up to 20 T1 lines and converts the electrical signals to an optical signal. These up to 20 time division multiplexed D4 DS1 signals are transmitted, via optical fiber 544 to the premises of the high usage customer 506.

At the premises of the high usage customer 506, the up to 20 time division multiplexed D4 DS1 signals may be demultiplexed by optional mux/demux 546. These signals are provided to the digital controller 550.

For calls originating from terminal equipment (e.g., modems) coupled with the digital controller 550 of the high usage customer 506 (e.g., Internet or enhanced service provider), the system of the present invention operates in the reverse order.

The first and second embodiments of the present invention advantageously permit non-blocking communication. Moreover, the second embodiment of the present invention provides the high usage customer 506 (e.g., an Internet or enhanced service provider) with a number of D4 formatted digital signals rather than TR008 formatted signals. This is advantageous because most enhanced service providers, such as Internet service providers for example, have equipment that can interpret D4 formatted data but not TR008 formatted data. Furthermore, the present invention allows the enhanced service provider 506 to test its modems or other terminal equipment by dialing individual non-hunt lines.

Figure 1:
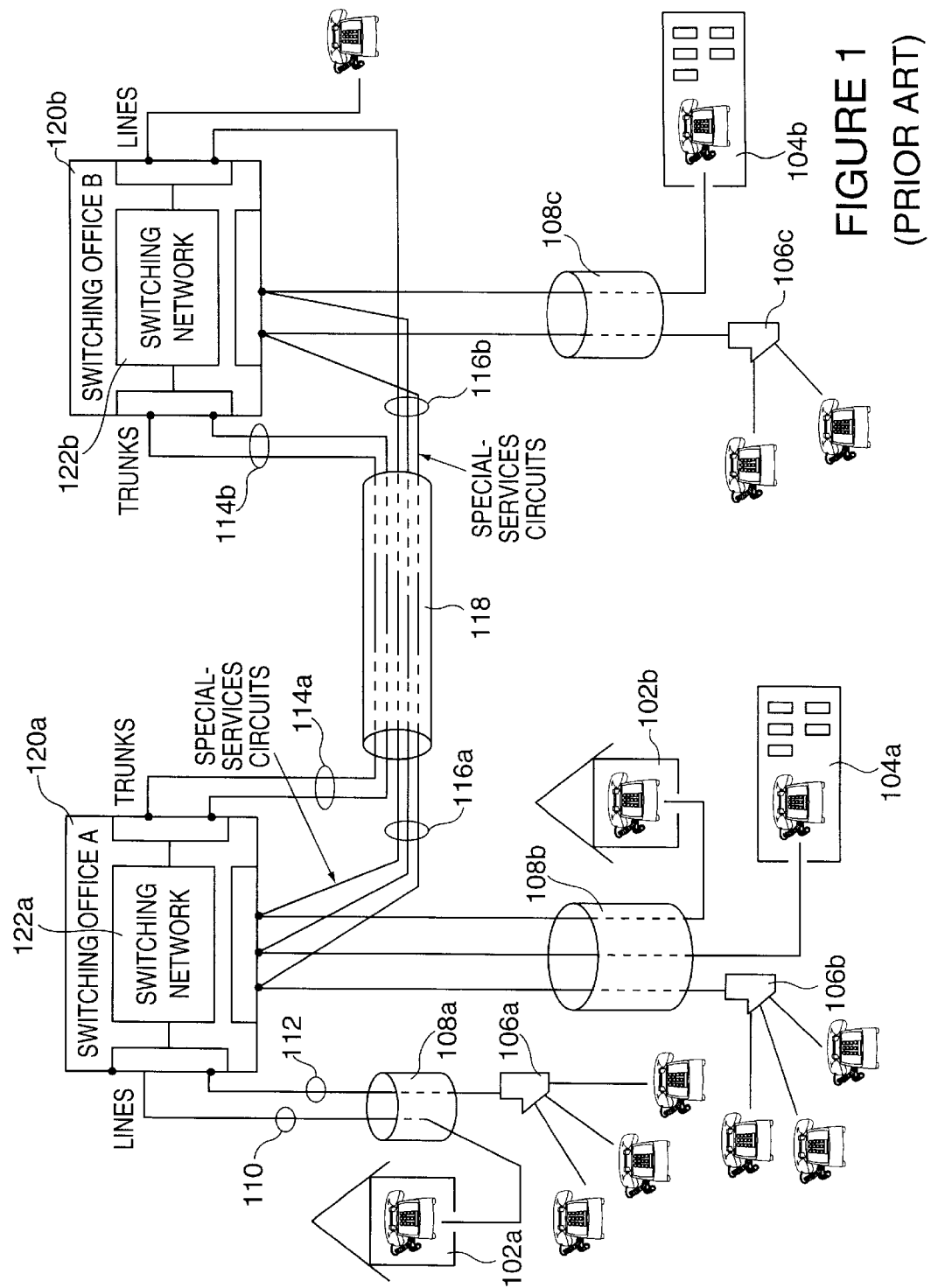
FIG. 1 is a diagram which illustrates the use of transmission facilities of a telephone service provider by various types of services.
Figure 2A:
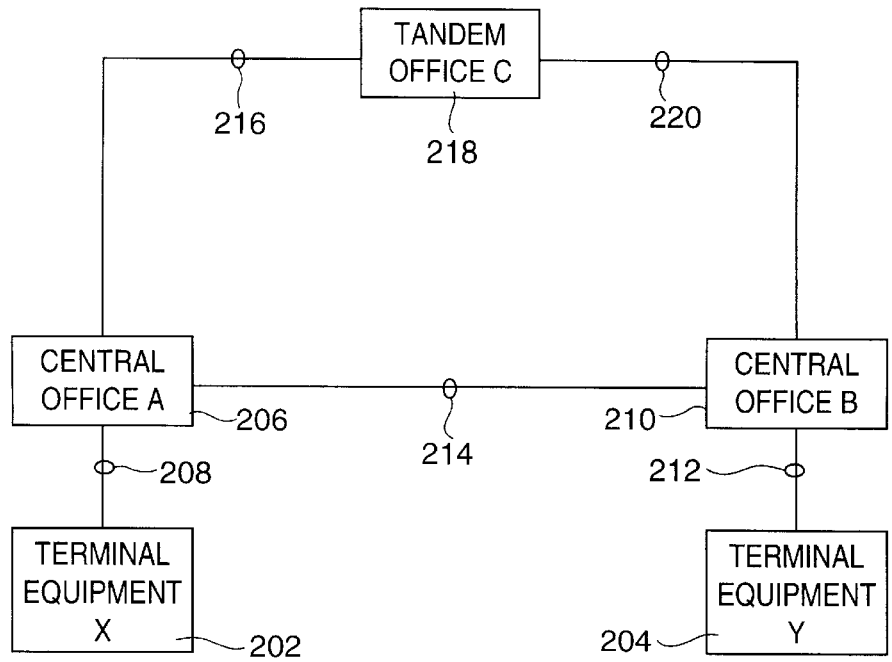
FIG. 2a is a block diagram used to illustrate the transmission facilities of a telephone service provider used in initiating, processing, and terminating a telephone call.
Figure 2B:
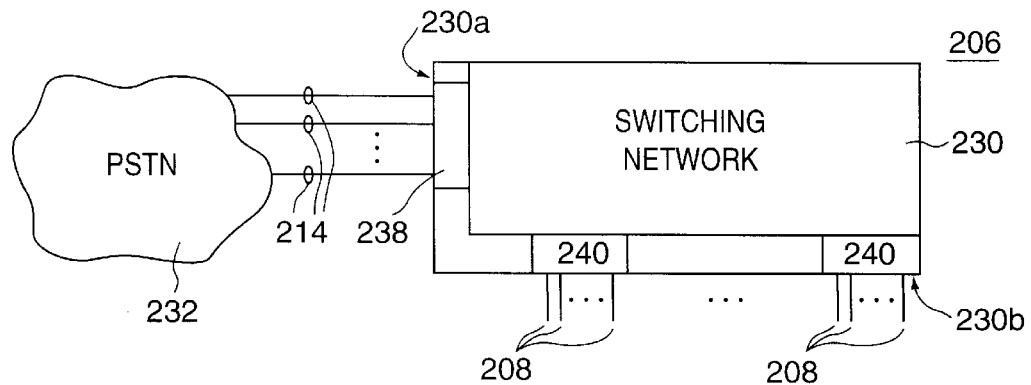
Figure 2C:
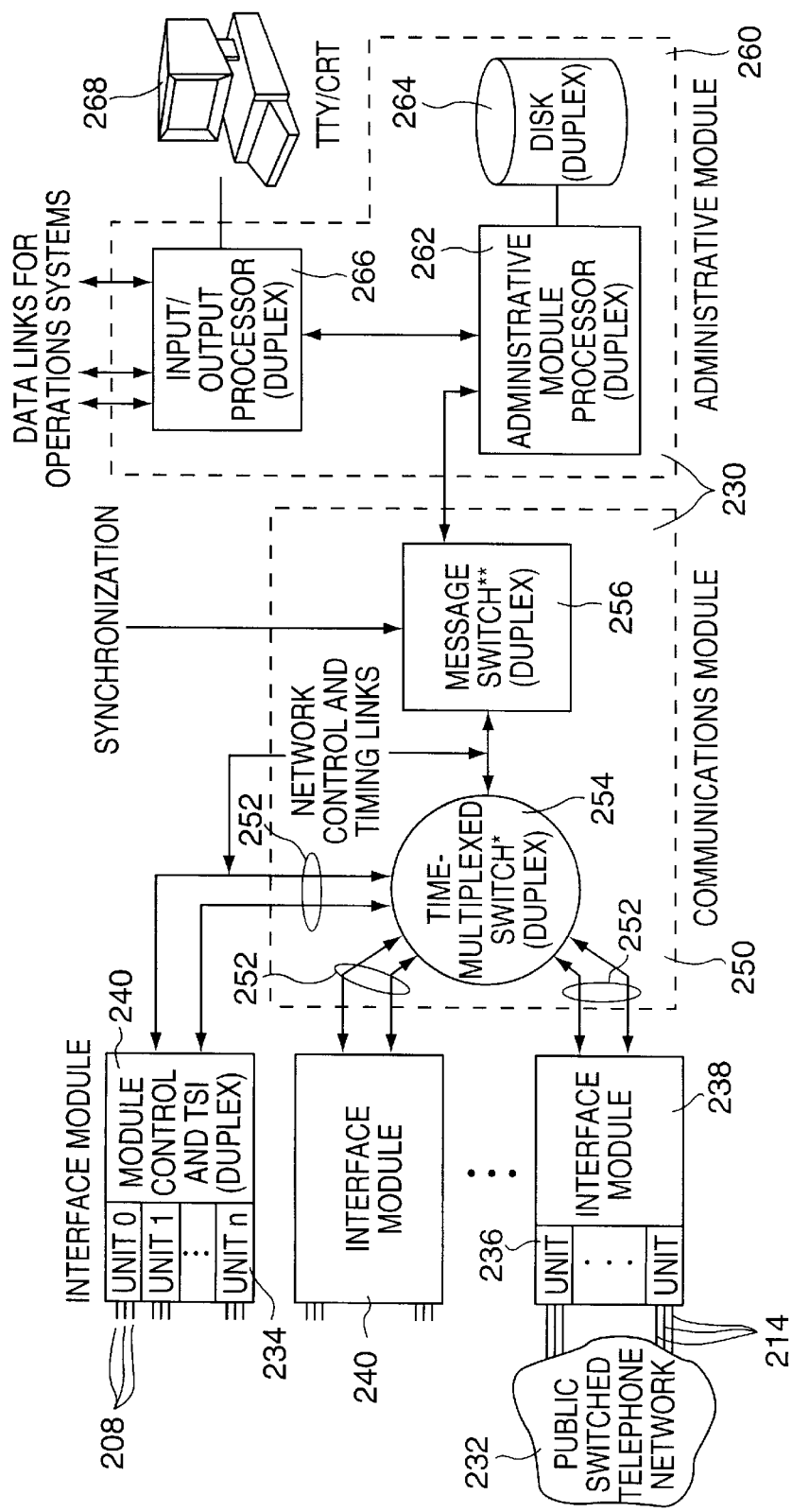
Figure 3A:
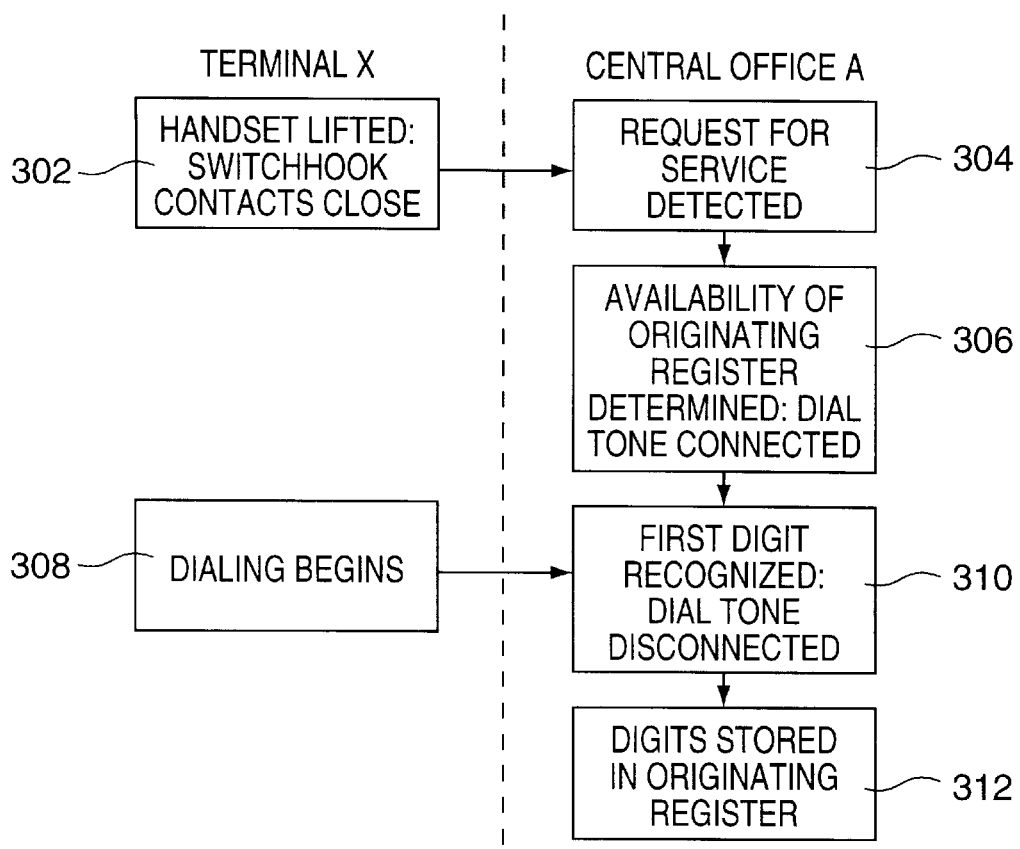
FIGS. 3a through 3d form a flow diagram which illustrates steps involved with initiating a call from a customer served by one central office to a customer served by another central office, processing the call, and terminating the call.
Figure 3B:
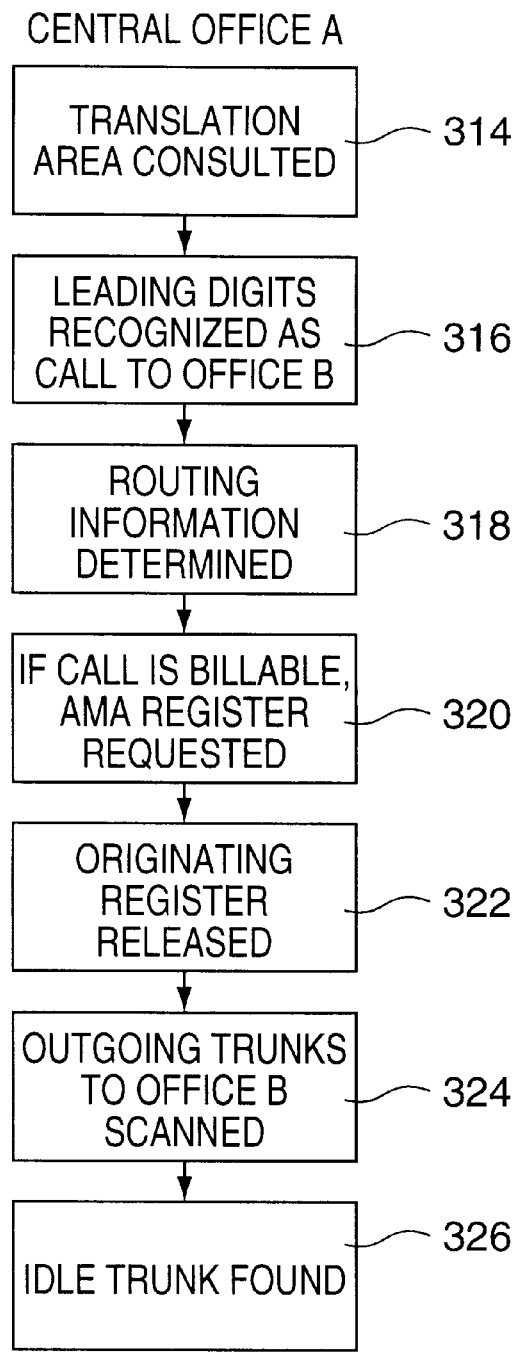
Figure 3C:
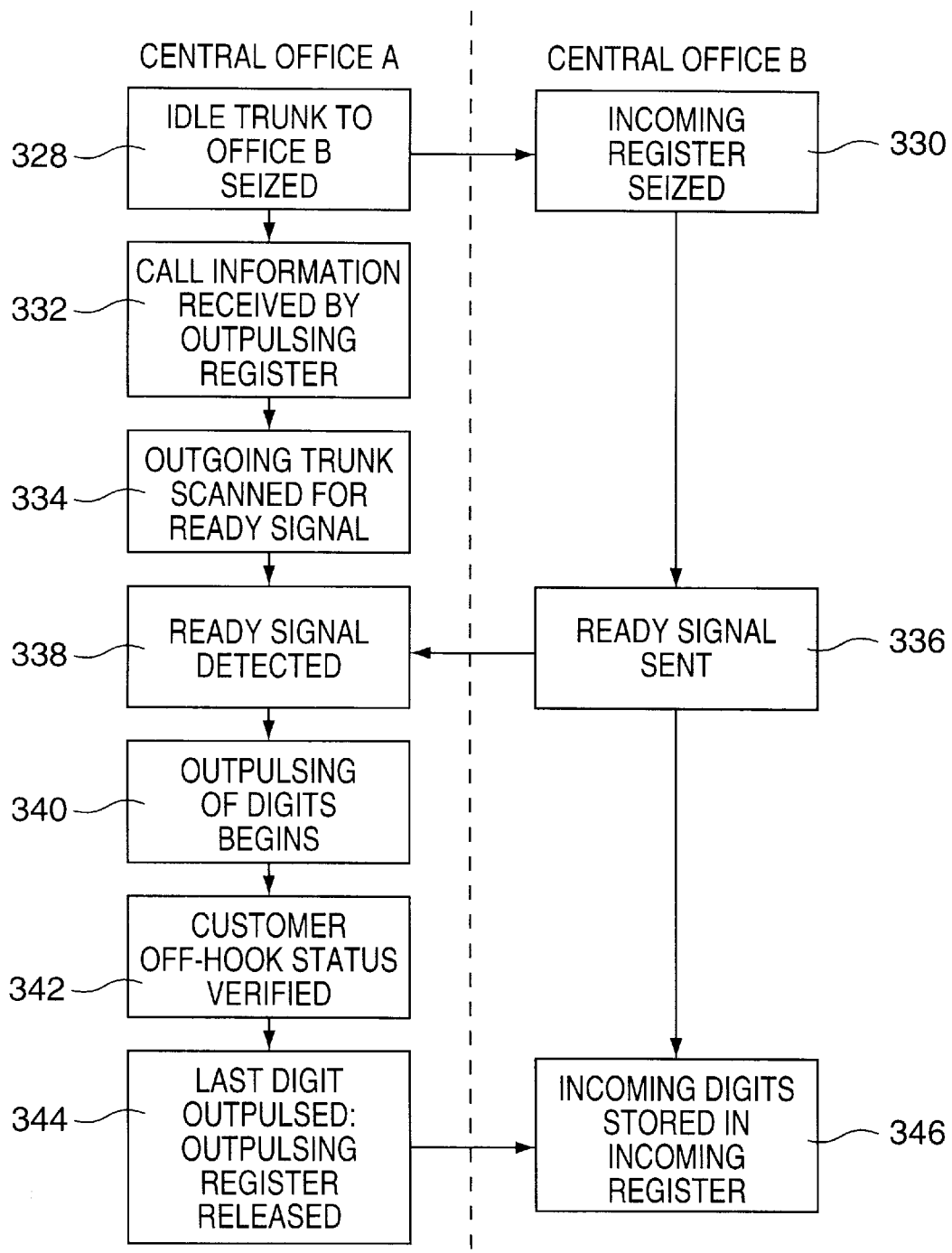
Figure 3D:
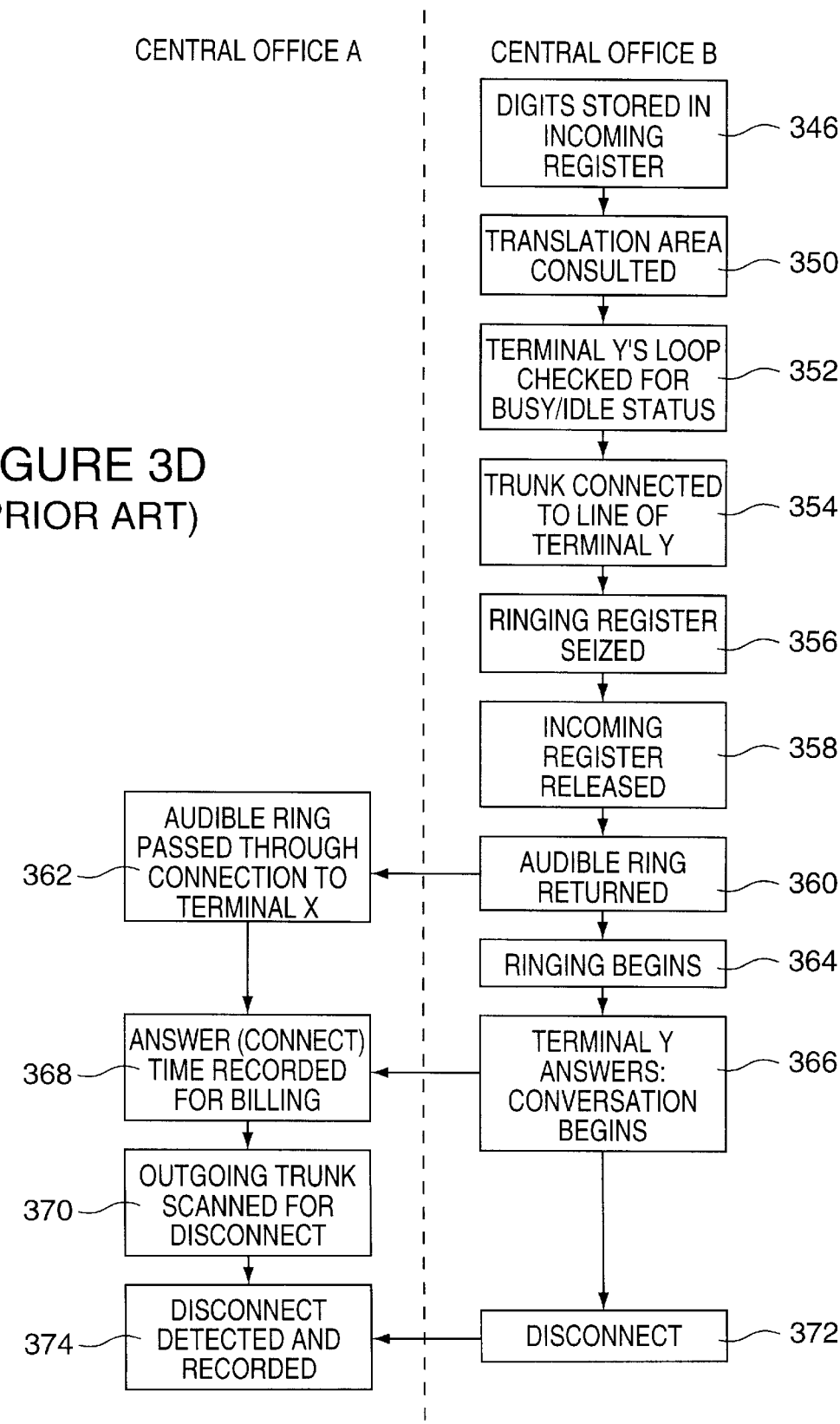
Figure 4A:
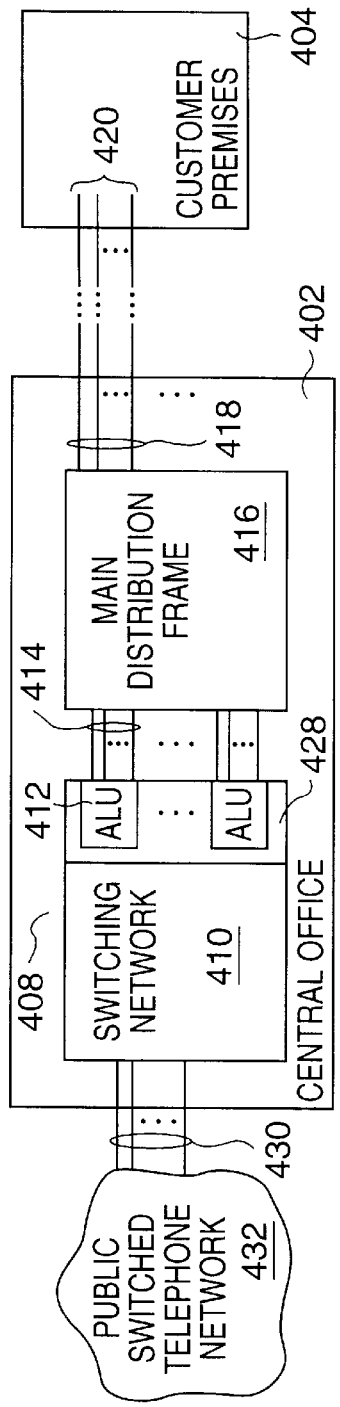
FIGS. 4a through 4c are block diagrams which illustrate known central office arrangements.
Figure 4B:
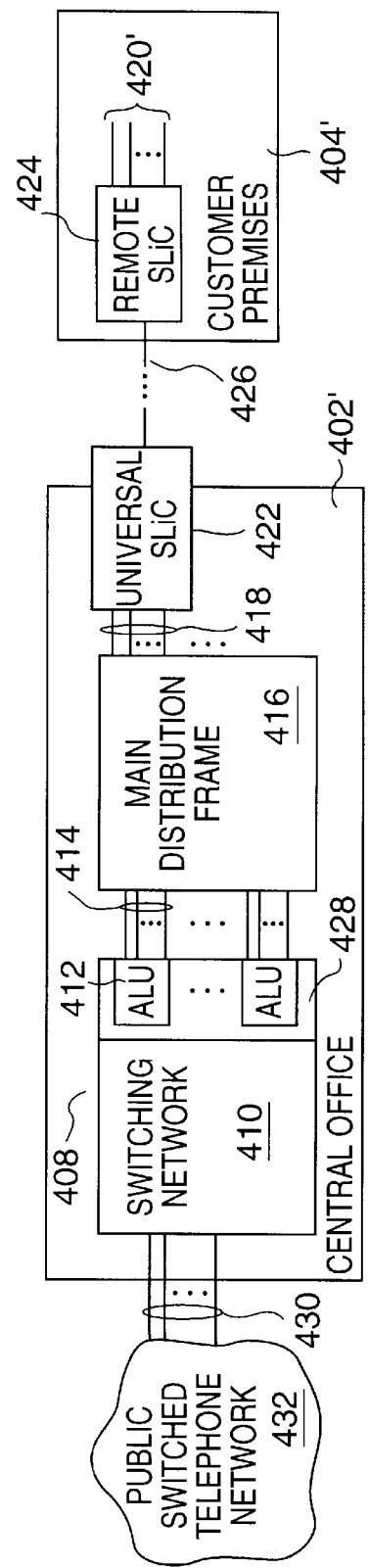

Finally, the first and second embodiments of the system of the present invention have a number of advantages over the prior art method discussed with reference to FIG. 4b. In the system of FIG. 4b, a channel undergoes a number of digital-to-analog and analog-to-digital conversions. Specifically, a digital channel from the public switched telephone network is converted to an analog channel by the switch 410. This analog channel is then converted to a digital channel by the universal SLC 422. Finally, at the customer premises 404, the digital channel is converted back to an analog channel by the remote SLC 424 before being provided to a modem (not shown). The modem converts the analog signals to digital signals. The present inventors suspect that certain problems being experienced by Internet and data access services users are caused, or exacerbated, by noise introduced by these signal conversions. Specifically, as noise due to these signal conversions accumulates with each conversion, the signal to noise ratio continues to decrease. If the noise is large enough, a modem, set for operation at a relatively high speed such as 28.8 Kbits/second for example, will decrease its speed to avoid transmission errors.

The second embodiment of the present invention is also advantageous because it does not require a remote or universal SLC at the customer's premises 506. By eliminating the need for a remote SLC, the customer has more room at its premises and the telephone service provider saves money.

Figure 5C:
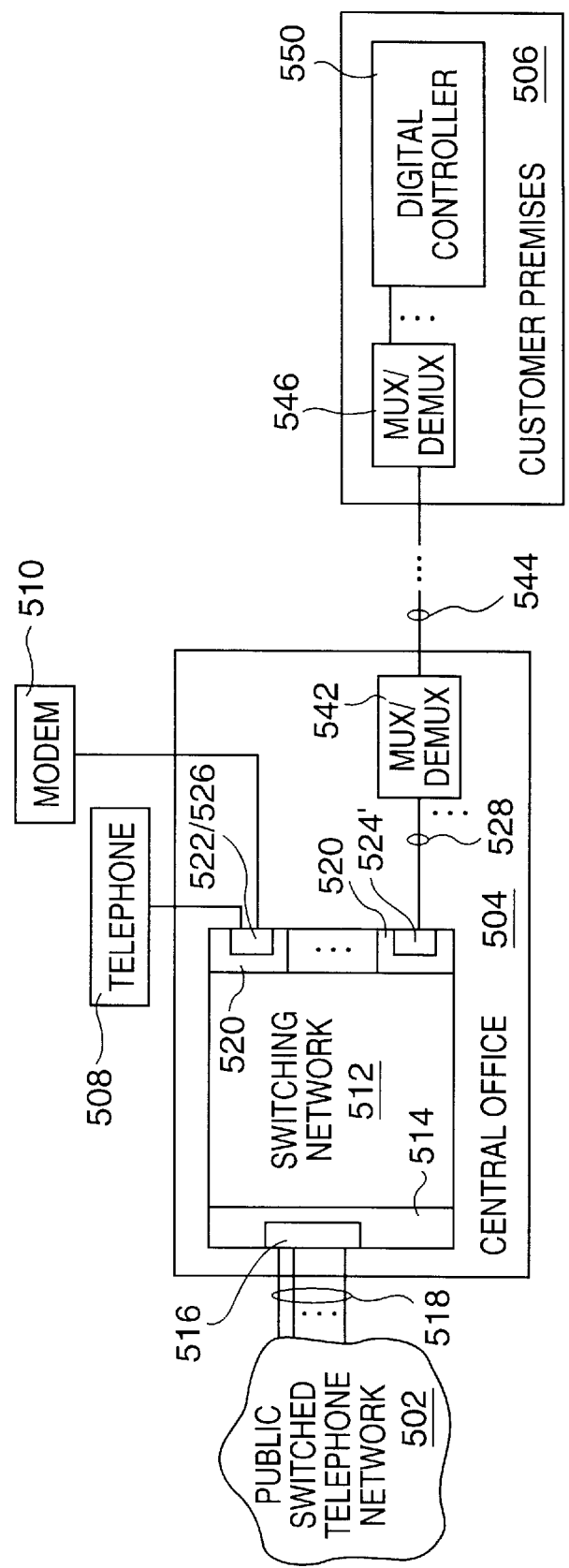
FIG. 5c is a high level block diagram of a third embodiment of the system of the present invention.

FIG. 5c is a block diagram of a third embodiment of the system of the present invention. In this embodiment, rather than using an IDCU 524, a customized subscriber module urban (or "SMU" sold by NorTel) 524' is provided as a line unit housed by an interface module 520. The subscriber module urban (SMU) 524' advantageously outputs D4 formatted DS1 digital signal(s) on a T1 line(s) 528. Thus, the third embodiment of the present invention is advantageous over the second embodiment illustrated in FIG. 5b because the signal conversion terminal 534 is no longer required. That is, the step 608 of converting a TR008 formatted DS1 signal to a D4 formatted DS1 signal is not required. Otherwise, the operation of the third embodiment of the present invention is similar to that of the second embodiment.

Figure 4C:
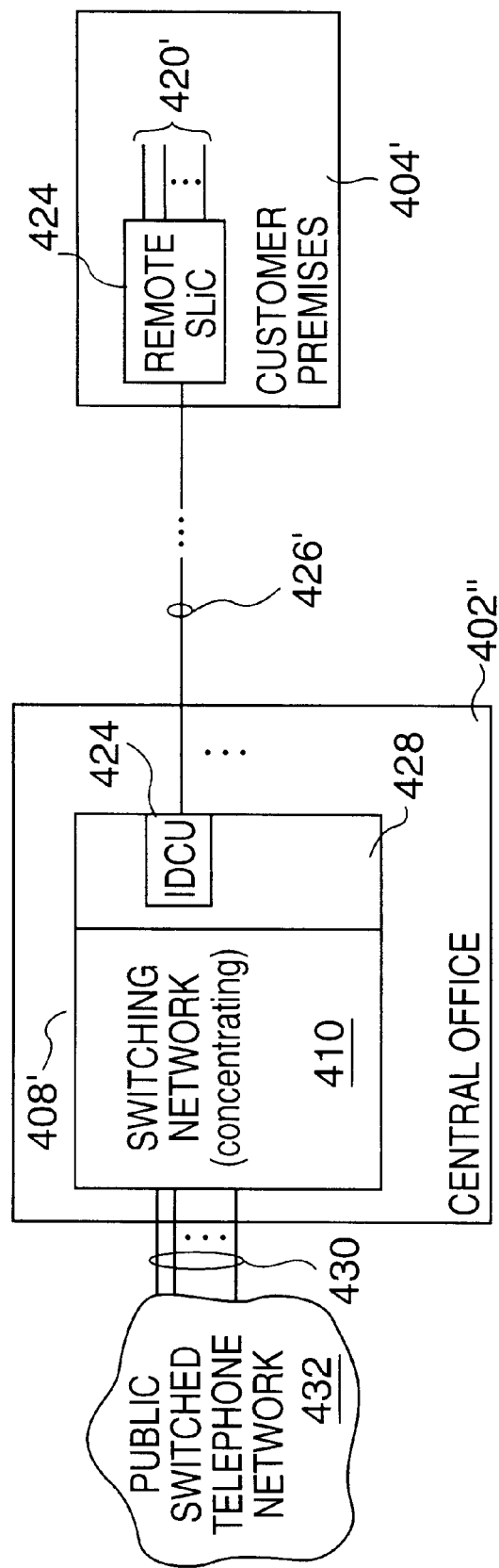
Figure 7:
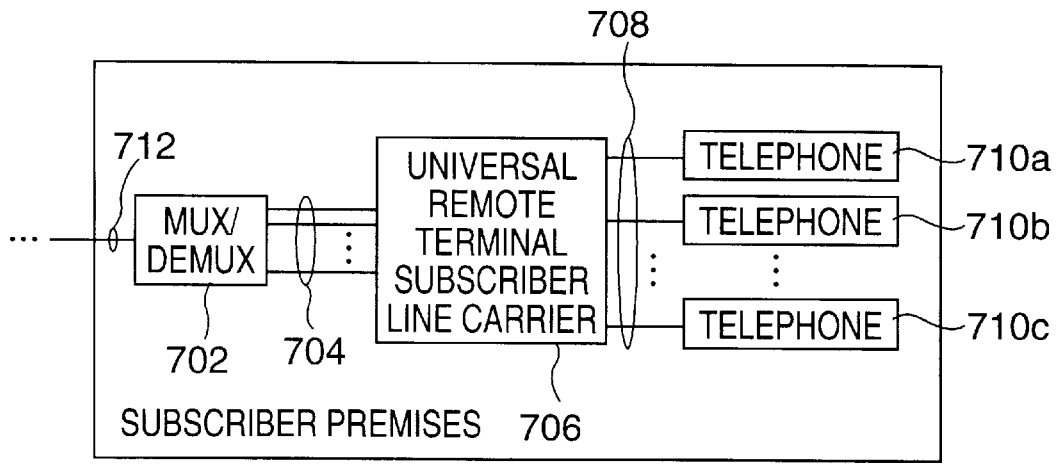
FIG. 7 is a block diagram of the customer premises of a stock broker or a ticket reseller as equipped to interface with known central office systems.

Although the system of the second and third embodiments of the present invention have been described as being advantageous for the provision of telephone lines to Internet service providers, other subscribers, such as stock traders and ticket resellers for example, can reap similar benefits from this system. Although subscribers such as stock brokers and resellers typically do not generate as much traffic as Internet service providers, they do generate above average traffic (e.g., between 8 CCS and 32 CCS) during peak hours. FIG. 7 is a block diagram of the premises of a stock broker or ticket reseller served by known systems. (See e.g., FIG. 4c.) A group of TR008 formatted digital signals are provided to a mux/demux 702. The mux/demux 702 demultiplexes these signals and provides TR008 formatted digital signals to a universal remote terminal subscriber line carrier (or "universal SLC") 706. The universal SLC 706 converts each TR008 formatted digital signal into a number of analog signals. These analog signals are provided, via lines 708, to telephones 710.

Figure 8:
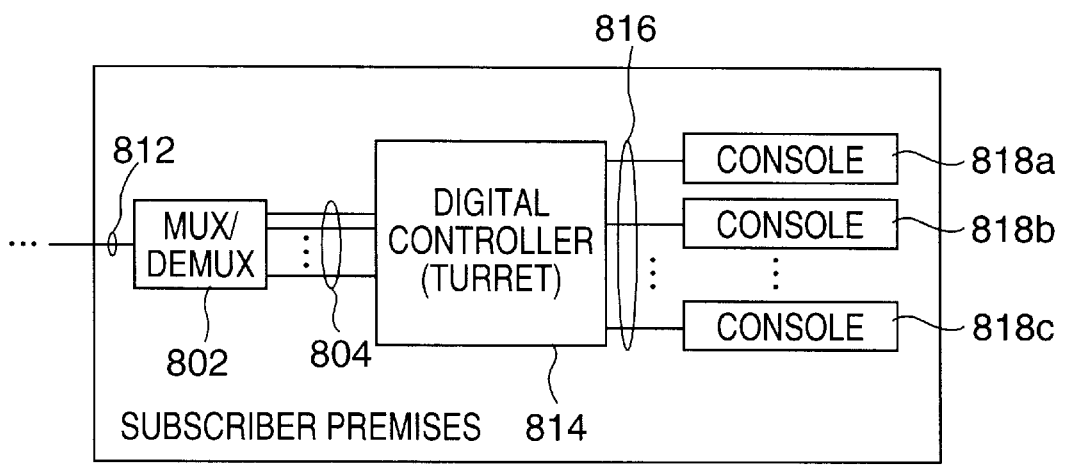
FIG. 8 is a block diagram of the customer premises of the stock broker or ticket reseller as equipped to interface with the second or third embodiments of the present invention.

FIG. 8 is a block diagram of the premises of a stock broker or ticket reseller as configured to work with the second or third embodiments of the present invention. In these applications, the concentration at the line side of the switching network can be greater than that described for Internet service providers. For example, the interface module and integrated digital channel unit may provide a concentration ratio of roughly between 2-to-1 and 6-to-1. As shown in FIG. 8, a group of D4 formatted digital signals are provided to the mux/demux 802. The mux/demux 802 demultiplexes this group of signals and provides the D4 formatted digital signal to a digital controller or "turret" 814. The digital turret 814 routes the 24 channels of each of the D4 formatted DS1 signals to appropriate consoles 818. The digital signals are converted to analog signals at the consoles 818.

Figure 9:
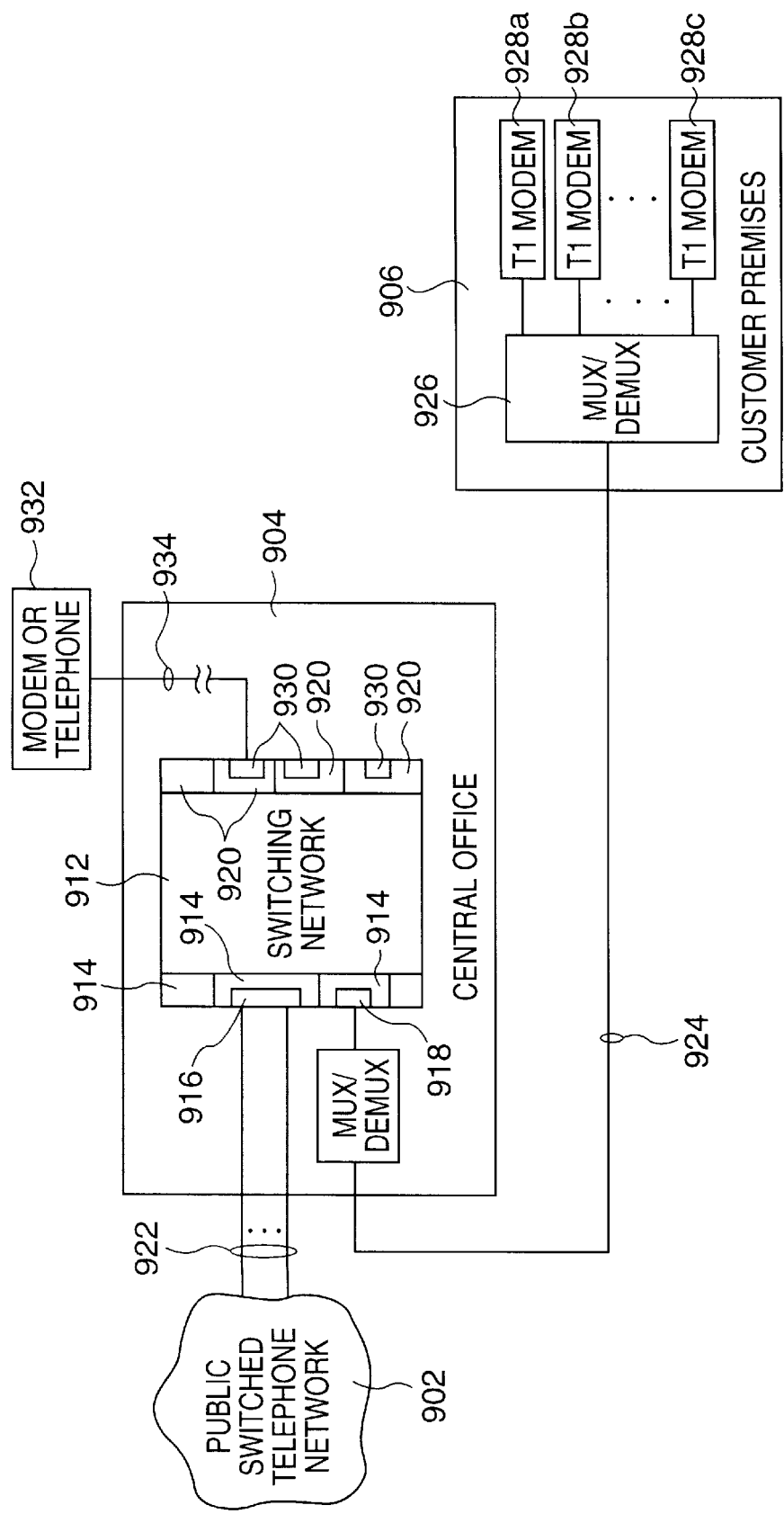
FIG. 9 is a block diagram of a third embodiment of the system of the present invention.

FIG. 9 is a block diagram of a fourth embodiment of the present invention. This fourth embodiment provides a simple trunk side solution for customers having data service units, such as advanced T1 "modems" for example. Specifically, in the fourth embodiment, the high usage customer's (e.g., Internet or enhanced service provider's) premises 906 is coupled with the switching network 912 of the central office 904 via a trunk 924, a digital line trunk unit 918, and an interface or switch module 914. Thus, calls between the public switched telephone network and the Internet or enhanced service provider 906 are via trunks 922, digital line trunk unit 916, interface module 914, switching network 912, interface module 914, digital line trunk unit 918, and trunk line 924. On the other hand, calls between a local subscriber 932, served by the central office 904, and the Internet or enhanced service provider 906 are via local loop 934, line side unit 930, interface module 920, switching network 912, interface module 914, digital line trunk unit 918, and trunk 924.

As discussed above, such a trunk side solution may be unacceptable to some enhanced service providers because they require individual lines for testing their modems while the numbers serviced by a trunk may be carried by any available channel of the trunk. Thus, as explained above, this precludes testing of modems by dialing a particular modem on a particular line. However, newer modems, known as T1 modems 928, and other newer terminal equipment have a feature known as an operational support system (or "OSS") which eliminates the need to dial into each individual modem or piece of equipment for testing. Specifically, the OSS tests the T1 modem 928 or other piece of equipment by initiating test calls from the modem 928 or other piece of equipment (rather than to the modem) toward the central office 904. The only requirement is that the trunk 924 be a two-way trunk for allowing such test calls to originate from the customer premises 906.

What is claimed is:

1. A system for providing telephone services to a high usage customer from a central office coupled with local users via loops and a public switched telephone network via trunks, the system comprising:
   a) a central office switch including
      i) a switching network,
      ii) a first interface module having a trunk unit, at least one of the trunks accessing the switching network via the trunk unit and the first interface module,
      iii) a second interface module having a digital line unit, the high usage customer accessing the switching network via the digital line unit and the second interface module, and
      iv) a third interface module having a line unit, at least one of the loops accessing the switching network via the line unit of the third interface module and the third interface module,
   wherein the digital line unit generates call progress signals,
   wherein the digital line unit provides a number of channels to the high usage customer and the second interface module provides a number of channel paths to the switching network, and
   wherein the number of channels to the high usage customer are not concentrated by the digital line unit and the second interface module.

2. The system of claim 1 wherein the concentration ratio of the number of channels to the high usage customer to the number of channel paths to the switching network provided by the second interface module is no more than one.

3. The system of claim 1 wherein the concentration ratio of the number of channels to the high usage customer to the number of channel paths to the switching network provided by the second interface module is less than one.

4. The system of claim 3 wherein the concentration ratio of the number of channels to the high usage customer to the number of channel paths to the switching network provided by the second interface module is 480-to-512.

5. A system for providing telephone services to a high usage customer from a central office coupled with local users via loops and a public switched telephone network via trunks, the system comprising:
   a) a central office switch including
      i) a switching network,
      ii) a first interface module having a trunk unit, at least one of the trunks accessing the switching network via the trunk unit and the first interface module,
      iii) a second interface module having a digital line unit, the high usage customer accessing the switching network via the digital line unit and the second interface module, and
      iv) a third interface module having a line unit, at least one of the loops accessing the switching network via the line unit of the third interface module and the third interface module,
   wherein the digital line unit generates call progress signals,
   wherein the digital line unit provides a number of channels to the high usage customer and the second interface module provides a number of channel paths to the switching network, and
   wherein the concentration ratio of the number of channels to the high usage customer to the number of channel paths to the switching network provided by the second interface module is no more than one.

6. The system of claim 5 wherein the digital line unit provides digital signals in the D4 format.

7. The system of claim 6 wherein the digital line unit is a subscriber module urban.

8. The system of claim 5 further comprising a signal conversion terminal for converting TR008 formatted digital signals to D4 formatted digital signals, coupled with the digital line unit, wherein the digital line unit provides digital signals in the TR008 format.

9. The system of claim 8 wherein the digital line unit is a integrated digital channel unit.

10. A system for providing telephone services to a high usage customer from a central office coupled with local users via loops and a public switched telephone network via trunks, the system comprising:
   a) a central office switch including
      i) a switching network,
      ii) a first interface module having a trunk unit, at least one of the trunks accessing the switching network via the trunk unit and the first interface module,
      iii) a second interface module having a digital line unit, the high usage customer accessing the switching network via the digital line unit and the second interface module, and
      iv) a third interface module having a line unit, at least one of the loops accessing the switching network via the line unit of the third interface module and the third interface module,
   wherein the at least one trunk accessing the switching network via the trunk unit and first interface module defines a number of channels and the first interface module provides a number of paths to the switching network and wherein concentration ratio of the number of paths to the switching network provided by the first interface module to the number of channels defined by all trunks terminated on the first interface module is no more than one.

11. A system for providing telephone services to a high usage customer from a central office coupled with local users via loops and a public switched telephone network via trunks, the system comprising;

a) a central office switch including
  i) a switching network,
  ii) a first interface module having a trunk unit, at least one of the trunks accessing the switching network via the trunk unit and the first interface module,
  iii) a second interface module having a digital line unit, the high usage customer accessing the switching network via the digital line unit and the second interface module, and
  iv) a third interface module having a line unit, at least one of the loops accessing the switching network via the line unit of the third interface module and the third interface module, wherein the at least one trunk accessing the switching network via the trunk unit and first interface module defines a number of channels and the first interface module provides a number of paths to the switching network and wherein concentration ratio of the number of paths to the switching network provided by the first interface module to the number of channels defined by all trunks terminated on the first interface module is no more than one.

12. A system for providing telephone services to a high usage customer from a central office coupled with local users via loops and a public switched telephone network via trunks, the system comprising:

a) a central office switch including
  i) a local trunk connection for providing communication between the high usage customer and the central office,
  ii) a switching network,
  iii) a first interface module having a first trunk unit, at least one of the trunks accessing the switching network via the first trunk unit and the first interface module,
  iv) a second interface module having a second trunk unit, the local trunk connection accessing the switching network via the second trunk unit and the second interface module; and
  v) a third interface module having a line unit, at least one of the loops accessing the switching network via the line unit of the third interface module and the third interface module, wherein the high usage customer has a premises including
  i) a multiplexer-demultiplexer having a concentrated side and an expanded side, and
  ii) a plurality of terminal equipment, each one of the plurality of terminal equipment having its own operational support system and being coupled with a port on the expanded sided of the multiplexer-demultiplexer of the premises of the high usage customer.

13. The system of claim 12 wherein the central office further includes a multiplexer-demultiplexer having a concentrated side and an expanded side, the expanded side of the multiplexer-demultiplexer of the central office being coupled with local trunk connection, and the system further including a communications link, a first end of the communications link being coupled with the concentrated side of the multiplexer-demultiplexer of the central office and a second end of the communications link being coupled with the concentrated side of the multiplexer-demultiplexer of the premises of the high usage customer.

14. The system of claim 12 wherein at least one of the plurality of the terminal equipment is a data service unit.

15. A system for providing telephone services to a high usage customer from a central office coupled with local users via loops and a public switched telephone network via trunks, the system comprising:

a) a central office switch including
  i) a switching network,
  ii) a first interface module having a trunk unit, at least one of the trunks accessing the switching network via the trunk unit and the first interface module,
  iii) a second interface module having a digital line unit, the high usage customer accessing the switching network via the digital line unit and the second interface module, and
  iv) a third interface module having a line unit, at least one of the loops accessing the switching network via the line unit of the third interface module and the third interface module, wherein the digital line unit generates call progress signals, and wherein a high usage customer is a customer that generates between 8 CCS and 36 CCS of network traffic during peak hours.

* * * * *